Dec. 23, 1958

P. VON ARX 2,865,321

DEVICE FOR METAL COATING PIPELINES, PARTICULARLY OF POWER STATIONS

Filed Nov. 4, 1953

INVENTOR

PAUL VON ARX

BY Bryant & Lowry

ATTORNEYS

INVENTOR
PAUL VON ARX

Dec. 23, 1958  P. VON ARX  2,865,321
DEVICE FOR METAL COATING PIPELINES, PARTICULARLY
OF POWER STATIONS
Filed Nov. 4, 1953  3 Sheets-Sheet 3
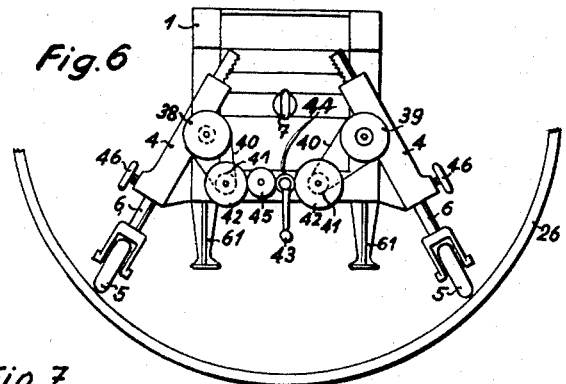
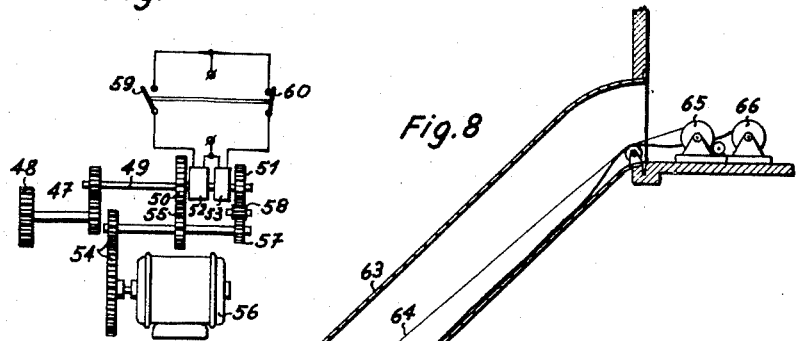
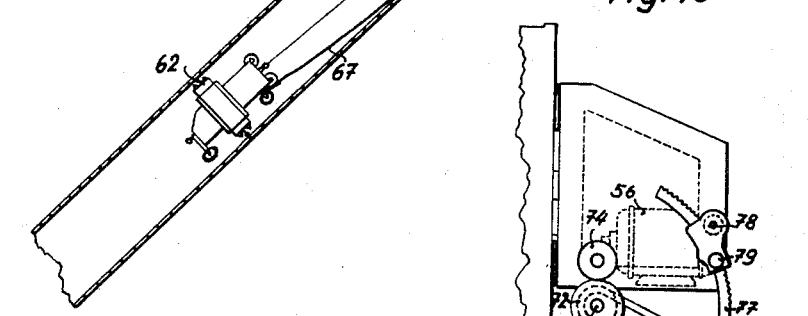
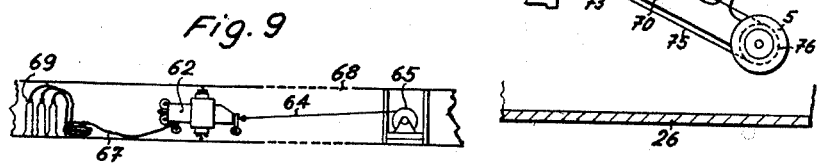
INVENTOR
PAUL VON ARX.
By Bryant & Lowry
ATTORNEYS

# United States Patent Office 2,865,321
Patented Dec. 23, 1958

2,865,321

DEVICE FOR METAL COATING PIPELINES, PARTICULARLY PIPELINES OF POWER STATIONS

Paul von Arx, Sissach, Switzerland, assignor to P. von Arx & Co., A. G., Sissach, Switzerland Application November 4, 1953, Serial No. 390,127

Claims priority, application Switzerland November 6, 1952

7 Claims. (Cl. 118—306)

It is known that the internal coating of pipelines with metal by Schoop's metal spraying process affords an effective protection against corrosion. But where the pipelines have already been installed, this internal metal-coating can be carried out only with difficulty, so that it can be done only exceptionally, on comparatively short pipelines. It was therefore not possible to provide pipelines of power stations, after they had been installed, with an internal metal layer, e. g., a sprayed-on layer of zinc.

The present invention concerns a method for covering the surface of pipelines, particularly the pipelines of power stations, with a layer of metal. According to this invention, the characteristic feature of this process is the motion of metal sprayers inside the pipeline, at a definite distance from the wall, in the longitudinal and lateral directions, and the method of obtaining the lateral motions by means of a swivelling carrier on a carriage. The longitudinal motions are, however, obtained by feeding the carriage, with the carrier fixed to it and with the metal sprayers, along the axis of the pipeline.

A suitable device to carry out this process is according to the present invention a carriage which can travel inside the pipeline which is to be metal-coated. A swivelling carrier is located on the carriage and driven by a driving mechanism, which is also provided on the carriage. Metal spray-guns are fixed along the circumference of the carrier, which can be adjusted radially to set their distances from the wall of the pipe. The carriage is connected with a feeding device so that it can be moved by the latter; this device feeds the carriage along the axis of the pipeline.

The drawing shows diagrammatically an example of a design of a device which is suitable for this process, and serves at the same time to explain the process.

Fig. 6 is an end view of one side of the device,

Fig. 7 shows a reversing drive,

Figs. 8 and 9 show a spraying device in the working position and

Fig. 10 shows a modified embodiment of a support of a wheel.

Figure 3:
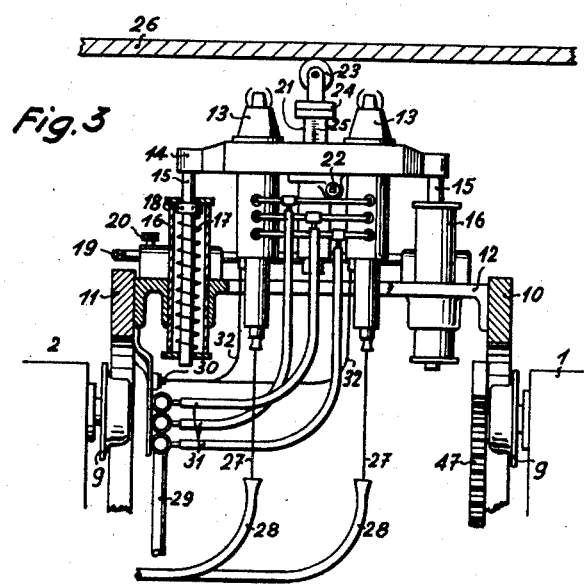
Fig. 3 is an assembly of the metal spray-guns at a larger scale.
Figure 4:
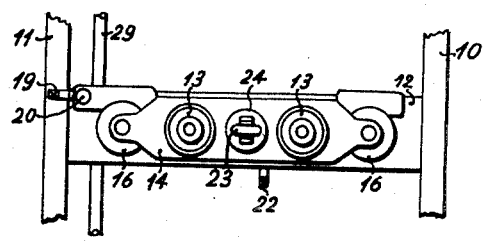
Fig. 4 is a plan view to Fig. 3.
Figure 5:
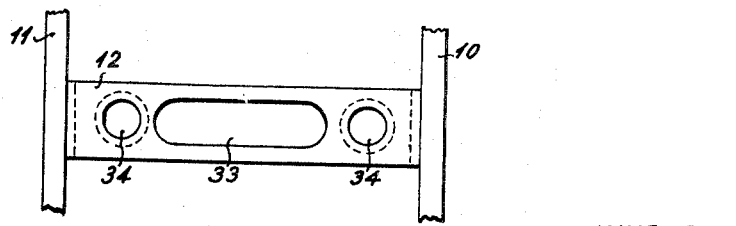
Fig. 5 is a plan view to a part of Fig. 3.

In the drawing, 1 denotes a front frame and 2 a rear frame of the machine, the frames are firmly connected by means of rods 3. Two guiding sleeves 4 are fixed to each of the two machine frames, so that their axes intersect above. In each of these sleeves slides a guiding rod 6 carrying a rubber-tyred wheel 5. Also, a draw ring 7 and 8 is fixed to each of the machine frames. Four guide rollers 9, supporting a ring 10 or 11, are located at each of the inside sides of the machine frames 1, 2. These rings are connected by means of several regularly spaced cross-bars 12. The drawing shows as an example four of these cross-bars, one each at the front, at the back, above and below. On each cross-bar a number (e. g. two) of metal spray-guns 13 of known design are located so that they can be moved together in a radial direction with respect to the rings 10 and 11. This arrangement can be seen most conveniently in Figs. 3 to 5. The metal spray-guns are mounted on a carrier plate 14 provided at each of its two ends with a guide bar 15. These bars are each sliding in a spring-casing 16 and are held by a spring 17, pressing against a collar 18, in the shown position. Thus, the carrier plate 14 can be moved against the action of the springs 17 towards the spring casings. The spring casings 16 can be moved longitudinally in the cross-bar 12. They are provided on their rear surfaces with teeth meshing with a gear wheel. The two gear wheels of the spring casings of each traverse are connected by means of a shaft 19. If this shaft is turned by means of a handle pushed on the suitably shaped end of the shaft, the carrier plate 14 will consequently move outwards or inwards with respect to the axis of the rings. The carrier plate 14 can be locked in a chosen position by means of a locking pin 20. A guide bar 21 is mounted in the middle so that it can slide in the direction of its axis. This bar is provided with a rack on one side, meshing with a pinion mounted below the carrier plate and driven through a shaft 22 by means of a handle which can be pushed on this shaft. The guide bar 21 carries at its upper end a feeler roller 23 which preferably should have rubber tyres and is supported by means of a holder 24 in the guide bar 21 in such a way that it can rotate about the longitudinal axis of the guide bar 21. A scale 25 is fixed to the guide bar 21 (see Fig. 3) and enables the position of the guide bar 21 or of the feeler roller 23 to be set with reference to the carrier plate 14. The support of the metal spray-guns 13 described here ensures that the distance of their orifices from a pipe wall 26 which is to be sprayed remains under all circumstances unchanged and equal to the distance set by means of the feeler roller 23. This is obtained by moving the carrier plate 14, after adjusting the machine to the required spraying distance by means of the feeler roller 23, towards the wall of the pipe, by a displacement of the spring casings 16, until the feeler roller 23 meets the pipe wall. After this the spring casings 16 are moved by a definite additional distance in the same direction so that the collar 18 is lifted from its shoulder and the spring 17 is compressed. The result is that the carrier plate 14 is now pressed by spring pressure against the pipe wall and the feeler roller 23 is kept pressed against the pipe wall 26 so that a constant spraying distance is ensured.

The feed wire 27 for the spray-gun, e. g., zinc wire, is supplied by means of a guide tube 28, of which one is allocated to each of the metal spray-guns. Three annular supply pipes 29 for gas, air and oxygen and a ring cable 30 for the ignition and control currents are arranged concentrically with the ring 11. The metal spray-guns 13 are connected by means of flexible pipes 31 to the annular pipes 29 and by means of flexible cables 32 to the ring cable 30. These connections pass through an elongated hole 33 in the cross-bar 12 (see Fig. 5). The cross-bar 12 is also provided with two holes 34 in which the spring casings 16 are mounted.

Figure 1:
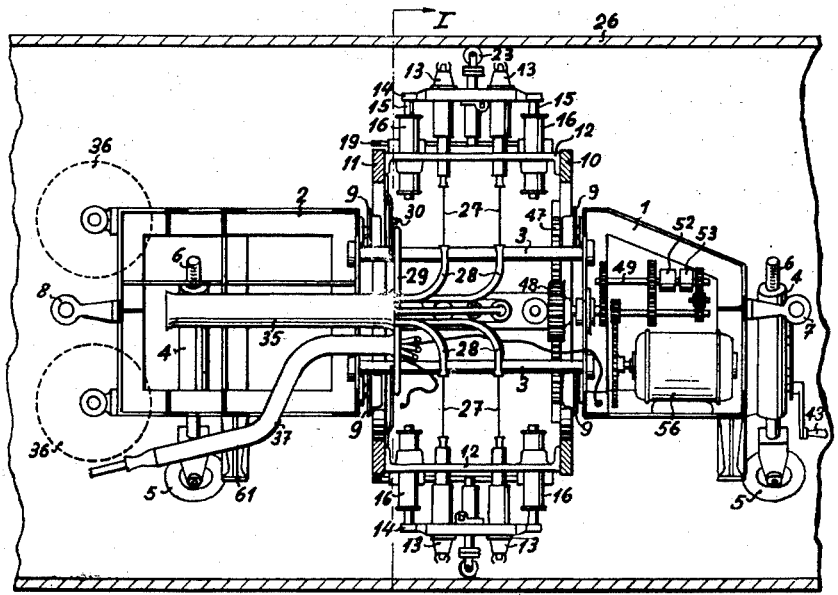
Fig. 1 is a longitudinal section through a metal spraying device.

The guide tubes 28 for the feed wires 27 are arranged in the machine frame 2 inside a common protective tube 35 (see Fig. 1). At the left-hand end of this frame the feed wire reels 36 are mounted so that they can rotate. The flexible pipes supplying the annular pipes 29 and the electric cables and wires are collected by a bent protective tube 37 passing below out of the frame 2 and then to the left outside the metal-spraying device.

Fig. 6, which is a view of the right-hand end of this metal-spraying device, shows the vertical adjustment device of this machine. It is a condition of the correct functioning of the metal-spraying device that the centres of the two rings 10, 11 coincide with the centre-line of the pipe. In order to arrange this easily for pipes of different diameters, the guiding rods 6 of the wheels 5 have each at their facing inner sides a rack, and a pinion is provided in the wall of each of the guiding sleeves 4. Each of these pinions is in mesh with one of the racks. The pinions of each of the long sides of the metal-spraying device are connected by a mechanism, not shown here, to transmit the motion of one pinion to the other. Also, the pinions at the right-hand end of the metal-spraying device are firmly fixed each to a sprocket wheel 38 or 39 respectively. The latter are connected by means of chains 40 to other sprocket wheels 41; each of these sprocket wheels is solidly fixed to a gear wheel 42 and can rotate on a pin. The right gear wheel 42 (see Fig. 6) is in mesh with another gear wheel 44 which can be driven by means of a handle 43, while an idler 45 is arranged between the left gear wheel 42 and the gear wheel 44. This arrangement has the purpose of lifting the wheels 5 or lowering the metal-spraying device, by turning the handle in a clockwise direction, or vice versa. When the metal-spraying device is in the required position, the guiding rods 6 are locked by means of locking screws 46.

Figure 2:
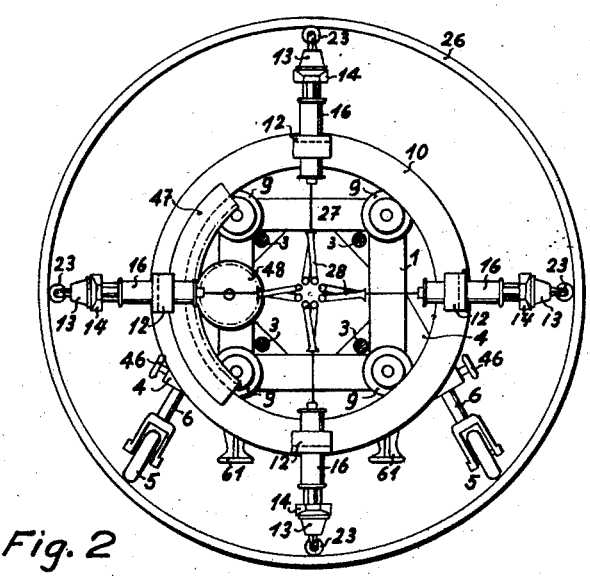
Fig. 2 is a cross-section along the line I—I of Fig. 1.

The continuation of the spraying along the axis of the pipe is achieved by moving the metal-spraying device described here along its axis. If the entire internal area of the pipe is to be sprayed, a rocking motion of the rings 10, 11 carrying the spray-guns must be superposed on the longitudinal motion. In the present case this rocking motion has to cover an angle of about 90°, but this angle can be reduced or increased according to the number of the spraying groups. In order to achieve this rocking motion, the ring 10 is provided with a toothed sector 47 (see Figs. 1, 2 and 7); meshing with a gear wheel 48 which, through another gear wheel, is driven by a shaft 49. The gear wheels 50 and 51 are located on, but not fixed to, the shaft 49 and can engage alternately with the shaft 49 by magnetic clutches 52 and 53 located between them. The gear wheel 50 is driven directly by an electric motor 56, through a gear drive 54 and a gear wheel 55, while the gear wheel 51 is driven by the gear drive 54, and a gear wheel 57 and an idler 58. Consequently, the gear wheels 50 and 51 rotate in opposite directions. The magnetic clutches 52 and 53 can be energised alternately, each by a limit switch, 59 or 60; the switches are mechanically connected in such a way that when one switch is closed, the other switch is open. The limit switches 59, 60 are fixed to the machine frame 1 and are actuated, just before the ring 10 reaches the end of its rocking motion, by a striker fixed to the ring. By a change in the gear ratio of the gearing described above or by a change in the speed of the electric motor 56, the speed of the rocking motion can be adjusted to the most suitable value. In order to achieve a perfect spraying effect inside the pipe, it is evident that the rocking motion and the longitudinal motion of the metal-spraying device are interdependent and must be arranged accordingly.

For the transportation of the device here two feet 61 are provided on each of the machine frames 1 and 2, by means of which the device can be supported. The feet 61 can also be usefully employed when the metal-spraying device is being inserted into a pipe and adjusted to the correct height.

Fig. 8 shows the described metal spraying device 62 in the working position inside an inclined pipeline 63. It is suspended on a rope 64 and let down at a definite speed along the pipe by means of a rope winch 65. A second winch 66 serves to feed the common supply cable 67, comprising the flexible tubes and cables, into the pipe. The cables are connected to the current supply etc. by means of slip rings and brushes, the flexible tubes to the various gas containers by means of grooved connections; all these connections are made on the winch 66. If there is enough space at the upper end of the pipeline, the common supply cable could be laid out on the floor in large coils and fed into the pipe as required. But if the space at the upper end of the pipeline is very limited, the rope winch 65 only is placed there, while the winch 66 for the common supply cable is placed at the lower end of the pipeline, or the common supply cable is laid ready here. According to whether it is more convenient to insert the metal-spraying device from above or from below into the pipeline, it is then let down or pulled up in the pipe 63 by means of the rope winch 65. If it is inserted from above, the common supply cable is first pulled up through the pipe and connected to the metal-spraying device. While the metal-spraying device is let down, the common supply cable is arranged in coils at the lower end of the pressure pipe. If there is no room at the upper end for the rope winch 65, it is fixed inside the upper end of the actual pipe and supported on spreading legs bearing against the wall of the pipe. This solution is generally employed for comparatively long pipelines and is shown applied to a horizontal pipe 63, in Fig. 9. In this case the pipe is sprayed in sections. After one section has been completed, the rope winch 65 is moved forward and fixed, the common supply cable 67 is again arranged in coils at the rear of the metal-spraying device 62 and connected to the gas cylinders 69 and to an electric supply cable brought up to this point. In the case of horizontal pipelines the arrangement can be greatly simplified by making the metal-spraying device so that it travels automatically, in which case the rope winch 65 is not required. Since the sectional relocation of this winch always requires much time, the automatically travelling type of the metal-spraying device saves much time, because after the completion of any section only the common supply cable 67 has to be moved forward, arranged in coils and connected to the gas cylinders 69, and the electric cable has to be moved forward and connected to the common supply cable.

In the automatically travelling type of the metal-spraying device which modification is shown in Figure 10 the wheels 5 are each arranged on a lever 70 which can pivot in a vertical plane. Fig. 10 shows an arrangement of this kind. The lever 70 is pivoted on a shaft 71 fixed to the machine frame. A chain wheel 72 and a gear wheel 73 solidly connected to the chain wheel can rotate on said shaft. The gear wheel 73 is driven by an electric motor 56 through another gear wheel 74 and other drives (not shown). The sprocket wheel 72 drives another sprocket wheel 76 by means of a chain 75; the sprocket wheel 76 is located on the shaft of the wheel 5 and solidly fixed to it.

A toothed sector 77 partly surrounding the shaft 71 is fixed to the lever 70 and engages with a pinion. The pinion can be driven by means of a handle 78 which can be pushed on the pinion shaft. The angular position of the lever 70, thus adjusted, is located by means of a locking screw 79. It is naturally possible to adjust the four pivoting levers 70 together. Also, either all four wheels or only the two wheels 5 on the machine frame 1 are driven. The automatically travelling metal-spraying device has that advantage that the two motions, along and across the pipe, are definitely connected, so that it is certain that their relative interdependence will not change.

In order to avoid the necessity of having to move up the various flexible pipes for the gas supply, the gas cylinders could also be fixed to the machine frame 2. There remains then only an electric cable for the connection to the mains and for the various control wires, which can easily be moved up to follow the machine. When using a winch for the cable, the comparatively complicated screw connections for the flexible pipes also will not be required. If the diameter of the pipe is rather small, it is not possible to fix the gas cylinders on the machine frame. In this case it is convenient to mount the gas cylinders on a special truck which is coupled to the metal-spraying device, so that it is still possible to use only short lengths of flexible pipes.

Although the device described was assumed to be fitted with metal spray-guns for the purpose of the illustrations and explanations, there is no reason why it could not be fitted with paint spray-guns and used for coating the internal surface of pipes with a coat of paint, e. g., tar coating.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. Spray apparatus with a movable mounting frame for coating the inside of pipes with sprayed materials, comprising a frame with radially adjustable rollers for supporting the frame centrally in the pipe while it is moved axially therein, a plurality of spray nozzles equiangularly spaced annularly around said frame, a carrier for said spray nozzles rotatably mounted on the frame coaxially of the pipe when the frame is in adjusted position for coating a pipe of a particular diameter, gear means for oscillating said carrier through an angle substantially equal to that between the spray nozzles, flexible supply lines for said oscillating spray nozzles, means for driving said gear means alternately in reverse directions to provide said oscillation, and means for axially moving said frame along the pipe.

2. Spray apparatus as defined in claim 1 having legs on said frame for supporting the apparatus when said adjustable rollers are fully retracted.

3. Spray apparatus as defined in claim 1, said means for driving said gear means including an electric motor mounted on said frame and a power line for supplying current connected to said motor, said moving means comprising a winch and line at one end of said pipe, said line extending and connected to said frame for controlling the movement of said apparatus along the pipe.

4. Apparatus as defined in claim 3, a cable connected to said frame comprising said power line and supply lines for said flexible spray nozzle supply lines, and sources of supply for said supply lines and power line.

5. Apparatus as defined in claim 4, a second winch between said sources and said cable for paying out said cable to said apparatus in cooperation with the length of the line payed out by said first winch.

6. Apparatus as defined in claim 3, and sources of supply comprising pressure tanks mounted in one end of said pipe and connected to said flexible supply lines.

7. Apparatus as defined in claim 3, sources of supply for said spray nozzles comprising pressure tanks mounted in one end of said pipe and connected to said flexible supply lines, and means for driving said rollers in accordance with the spraying oscillations to advance the apparatus in the pipe at the rate required for complete coating of the pipe by the spray material.

References Cited in the file of this patent
UNITED STATES PATENTS

| | | |
|---|---|---|
| 1,199,314 | Subers | Sept. 26, 1916 |
| 1,932,215 | Johnson et al. | Oct. 24, 1933 |
| 2,017,042 | Dougherty | Oct. 15, 1935 |
| 2,088,348 | Schlupmann | July 27, 1937 |
| 2,108,319 | Perkins | Feb. 15, 1938 |
| 2,140,298 | Miller | Dec. 13, 1938 |
| 2,185,570 | Ridley | Jan. 2, 1940 |
| 2,324,478 | Bleakley et al. | July 20, 1943 |
| 2,397,482 | Griffin | Apr. 2, 1946 |
| 2,461,517 | Carnevale | Feb. 15, 1949 |
| 2,631,565 | Sargrove | Mar. 17, 1953 |